US012128781B2

(12) United States Patent
Tsai et al.

(10) Patent No.: US 12,128,781 B2
(45) Date of Patent: Oct. 29, 2024

(54) VESSEL AUTOMATIC BERTHING WIRELESS CHARGING INTEGRATED SYSTEM AND OPERATING METHOD THEREOF

(71) Applicant: SHIP AND OCEAN INDUSTRIES R&D CENTER, New Taipei (TW)

(72) Inventors: Min-Long Tsai, New Taipei (TW); Han-Chun Kao, New Taipei (TW); Hung-Hsi Lin, New Taipei (TW); Ta-Hsiu Tseng, New Taipei (TW); Bing-Xian Chen, New Taipei (TW); Cheng-Hsien Hsueh, New Taipei (TW); Yi-Hsin Chan, New Taipei (TW)

(73) Assignee: SHIP AND OCEAN INDUSTRIES R&DCENTER, New Taipei (TW)

( * ) Notice: Subject to any disclaimer, the term of this patent is extended or adjusted under 35 U.S.C. 154(b) by 503 days.

(21) Appl. No.: 17/548,382

(22) Filed: Dec. 10, 2021

(65) Prior Publication Data

US 2023/0173935 A1     Jun. 8, 2023

(30) Foreign Application Priority Data

Dec. 8, 2021   (TW) ................................ 110145903

(51) Int. Cl.
*B60L 53/38* (2019.01)
*B60L 53/36* (2019.01)

(52) U.S. Cl.
CPC .............. *B60L 53/38* (2019.02); *B60L 53/36* (2019.02); *B60L 2200/32* (2013.01)

(58) Field of Classification Search
CPC ....................................................... B60L 53/38
USPC ................................................... 320/109
See application file for complete search history.

(56) References Cited

U.S. PATENT DOCUMENTS

| 7,037,038 | B1 * | 5/2006 | Haski ..................... | E04H 4/1263 |
| | | | | 405/60 |
| 2015/0002092 | A1 * | 1/2015 | Niizuma ................. | B60L 53/51 |
| | | | | 320/108 |
| 2016/0049799 | A1 * | 2/2016 | Takatsu ................. | B60L 53/122 |
| | | | | 307/104 |
| 2018/0326857 | A1 * | 11/2018 | Pohjanheimo ........... | H02J 7/02 |
| 2020/0102058 | A1 * | 4/2020 | Bardelli ................. | B63B 59/08 |

(Continued)

FOREIGN PATENT DOCUMENTS

| CN | 117799777 A | * | 4/2024 | |
| WO | WO-2021244818 A1 | * | 12/2021 | .............. B60L 53/12 |

*Primary Examiner* — Jerry D Robbins
(74) *Attorney, Agent, or Firm* — Cheng-Ju Chiang (57) ABSTRACT

The invention discloses a vessel automatic berthing wireless charging integrated system and operating method thereof. The invention comprises a charging barge and at least one vessel. The charging barge comprises a power, a distribution board and a locking module control system, and every vessel comprises an automatic pilot system, a vessel controlling system and a wireless power receiving module. A bow berthing module of the present invention moors the vessel. After a guiding structure of the bow berthing module straightly aligns bow direction of the vessel, a wireless power supplying module of a side berthing module matches with the wireless power receiving module then charges the vessel.

8 Claims, 7 Drawing Sheets

(56) References Cited

U.S. PATENT DOCUMENTS

2021/0394625 A1* 12/2021 Curran .................. H02J 7/0042
2021/0394633 A1* 12/2021 Curran .................... B60L 53/12

* cited by examiner

VESSEL AUTOMATIC BERTHING WIRELESS CHARGING INTEGRATED SYSTEM AND OPERATING METHOD THEREOF

TECHNICAL FIELD

The present invention discloses a vessel automatic berthing wireless charging integrated system and the operating method thereof. The vessel automatic berthing wireless charging integrated system and the operating method comprise a specific bow berthing module.

BACKGROUND OF RELATED ARTS

The demand for tourism, industry, or even military use, such as the gradual unmanned use of vehicles such as vessels, is an irreversible trend.

In traditional technology, vehicles such as diesel-powered, hybrid-powered, or pure-electric-powered vessels rely on manpower for guidance, mooring, and energy supply operations such as oil or electricity when they are berthed. However, in the general manual mooring method, the thickness of the rope is proportional to the draught of the vessel, thus the mooring is a dangerous and hard work to workers.

Furthermore, with the development of autonomous navigation vessels, the future vessels will have the smart control technology. The requirement of the manpower will gradually decrease. In fact, the mooring and charging tasks that generally require crew members can be assisted by various automatic and intelligent auxiliary devices.

Moreover, in the era of fully unmanned autonomous navigation vessels, there will be no crew members who can assist in the mooring and charging of the vessels. Therefore, when the vessel approaches or leaves the barge, the need for automatic mooring, unmooring, and wireless charging is becoming more and more important.

SUMMARY

To resolve the drawbacks of the prior arts, the present invention discloses a vessel automatic berthing wireless charging integrated system and the operating method thereof.

The vessel automatic berthing wireless charging integrated system comprises a charging barge and at least one vessel. The charging barge comprises a power, a distribution board and a locking module control system. The distribution board is connected to the power, and the locking module control system is connected to the distribution board. The locking module control system comprises a controller, a wireless communication module, a bow berthing module, and a side berthing module. The wireless communication module is connected to the controller, and the bow berthing module and the side berthing module are also connected to the controller The bow berthing module comprises a base, a rotary arm and a gripper. The base is connected to the controller, the rotatable arm is connected to the base, and the gripper is located at the end of the rotatable arm. The gripper comprises a guiding structure and a locking structure. As for the side berthing module including a wireless power supplying module, the wireless power supplying module is connected to the distribution board.

The single vessel comprises an automatic pilot system, a vessel controlling system, and a wireless power receiving unit. The vessel controlling system is connected to the automatic pilot system and communicates with the wireless communication module, and the wireless power receiving unit is connected to the vessel controlling system, and is detachably matched with the wireless power supplying module.

The bow berthing module moors the vessel and the guiding structure of the bow berthing module straightly aligns bow direction of the vessel and then the wireless power supplying module of the side berthing module matches with the wireless power receiving module, charging the vessel.

The aforementioned operating method of the vessel automatic berthing wireless charging integrated system is completed by the following steps. First of all, the step (A) provides the aforementioned vessel automatic berthing wireless charging integrated system. In step (B), the bow berthing module is rotated until the bow berthing module is outside of the charging barge.

In step (C), the locking module control system confirms the receiving of a maintenance command or a requirement command from the vessel. If the maintenance command is received, then forwards to step (D1). If the requirement command is received, then forwards to step (D2). The step (D1) is to command the rotatable arm of the bow berthing module to rotate the gripper until the gripper is inside of the charging barge. The step (D2) is to rotate the gripper of the rotatable arm of the bow berthing module to moor the vessel when the vessel is approaching to the charging barge, then forwards to step (E).

In step (E), the bow direction of the vessel is straightly aligned via the gripper and the automatic pilot system commands the vessel controlling system to activate the side berthing module, then the side berthing module charges the vessel.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical effects of the present invention and to implement it in accordance with the contents of the specification, a preferred embodiment as shown in the figure is further described in detail as follows.

Figure 1:
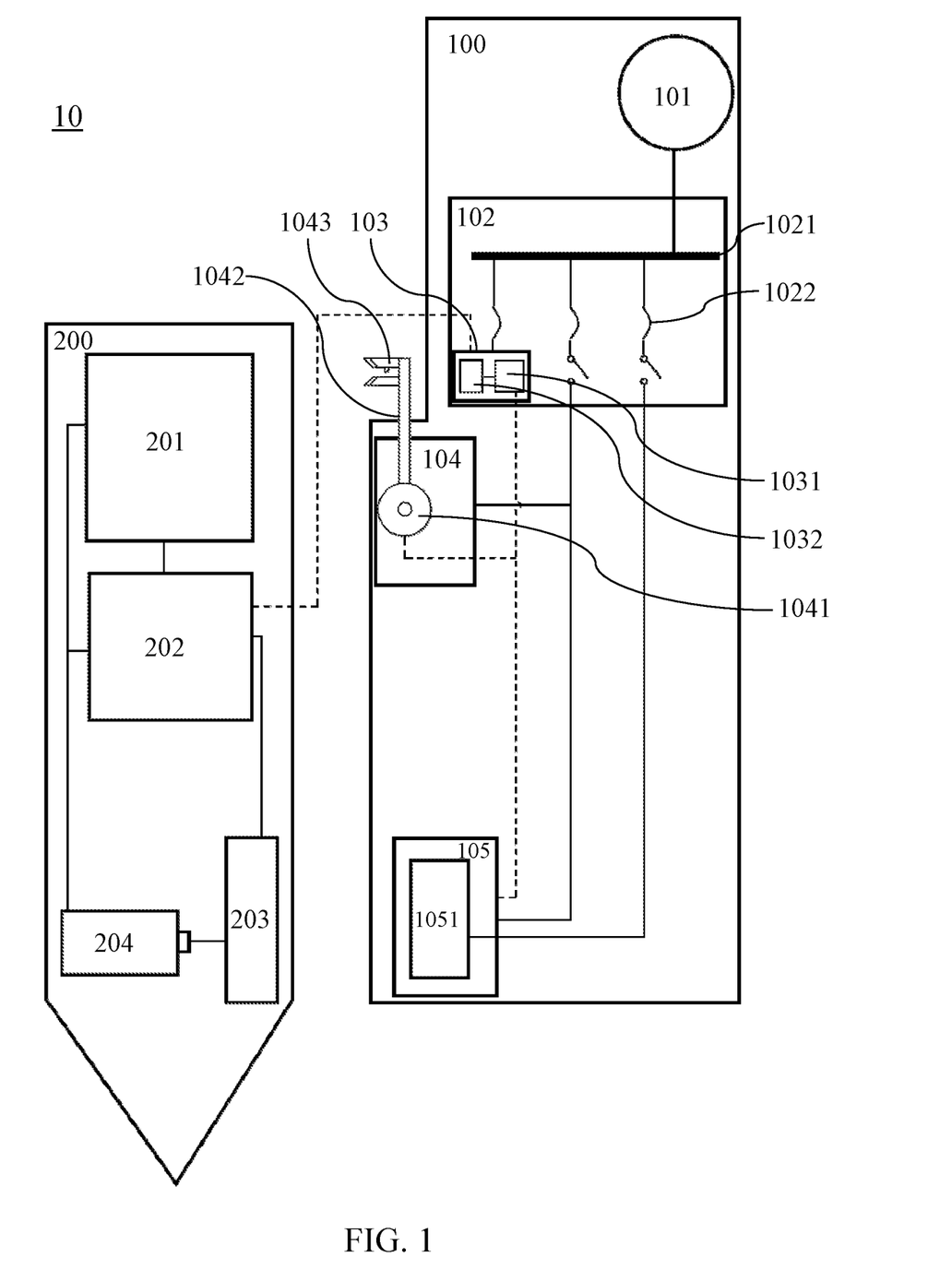
FIG. 1 is a schematic diagram of the embodiment of the present invention.

Please refer to FIG. 1, FIG. 1 is a schematic diagram of the embodiment of the present invention. As shown in FIG. 1, the vessel automatic berthing wireless charging integrated system 10 of the present embodiment is mainly constructed by two parts, comprising the charging barge 100 and vessel 200. In the present embodiment, the charging barge 100 is able to be any vehicle or platform that can float on water, such as barge, floatplane, or pontoon etc. The present invention is not limited thereto.

The charging barge 100 in present embodiment comprises power 101, distribution board 102, and locking module control system 103. In this embodiment, power 101 may be general commercial power, such as three-phase AC power. On the other hand, the AC power may also be generated by an AC power generator. Therefore, the distribution board 102 of the present embodiment is connected with the power 100.

The distribution board 102 of the present embodiment comprises busbar 1021 and safety unit 1022. Specifically, the safety unit 1022 is non-fuse circuit protection component. When the abnormal current, voltage or temperature is detected, the safety unit 1022 breaks and protects the circuit. Furthermore, the locking module control system 103 is connected to the busbar 1021 in the distribution board 102.

In FIG. 1, the connecting lines mean the power lines which illustrate the electrical connections, and the break lines mean the communicational connections (telecommunication). Hence, the locking module control system 103 of the embodiment comprises a controller 1031, a wireless communication module 1032, a bow berthing module 104 and a side berthing module 105. The bow berthing module 104 and the side berthing module 105 are connected with the locking module control system 103. The wireless communication module 1032 is connected to the controller 1031, and the bow berthing module 104 and side berthing module 105 are also connected to the controller 1031.

In this embodiment, the controller 1031 mainly controls the electromechanical control mechanical movement of the bow berthing module 104 and the side berthing module 105. The controller 1031 decides that the side berthing module 105 to provide the wireless power or not, according to the command received from the wireless communication module 1032. The controller 1031 may be a programmable logic controller (PLC), an industrial computer, a single-chip microcomputer, a microcontroller (MCU), a microprocessor (VIPU), or the combination thereof. The present invention is not limited.

Figure 2:
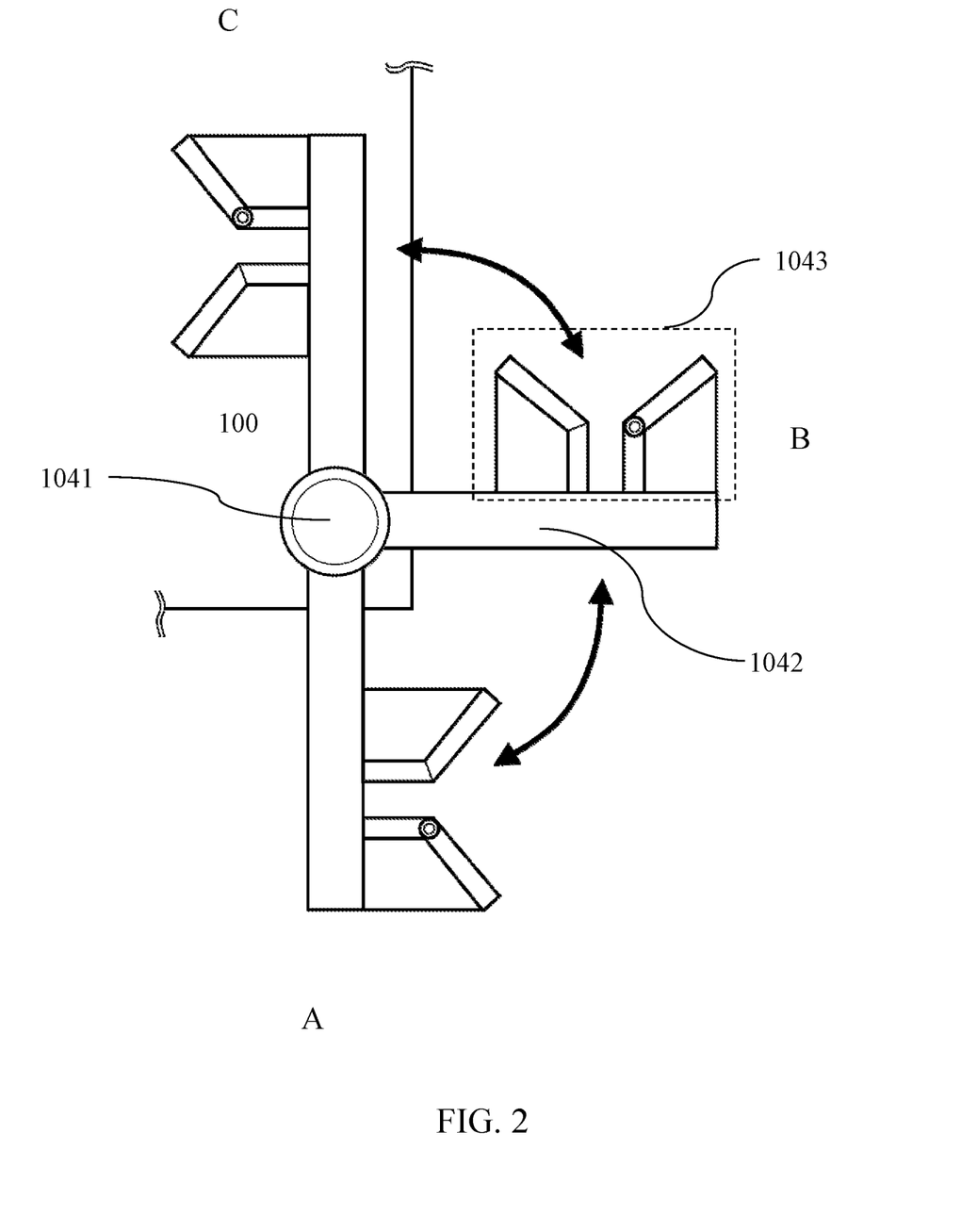
FIG. 2 is a schematic moving range diagram of the bow berthing module of the embodiment of the present invention.
Figure 3:
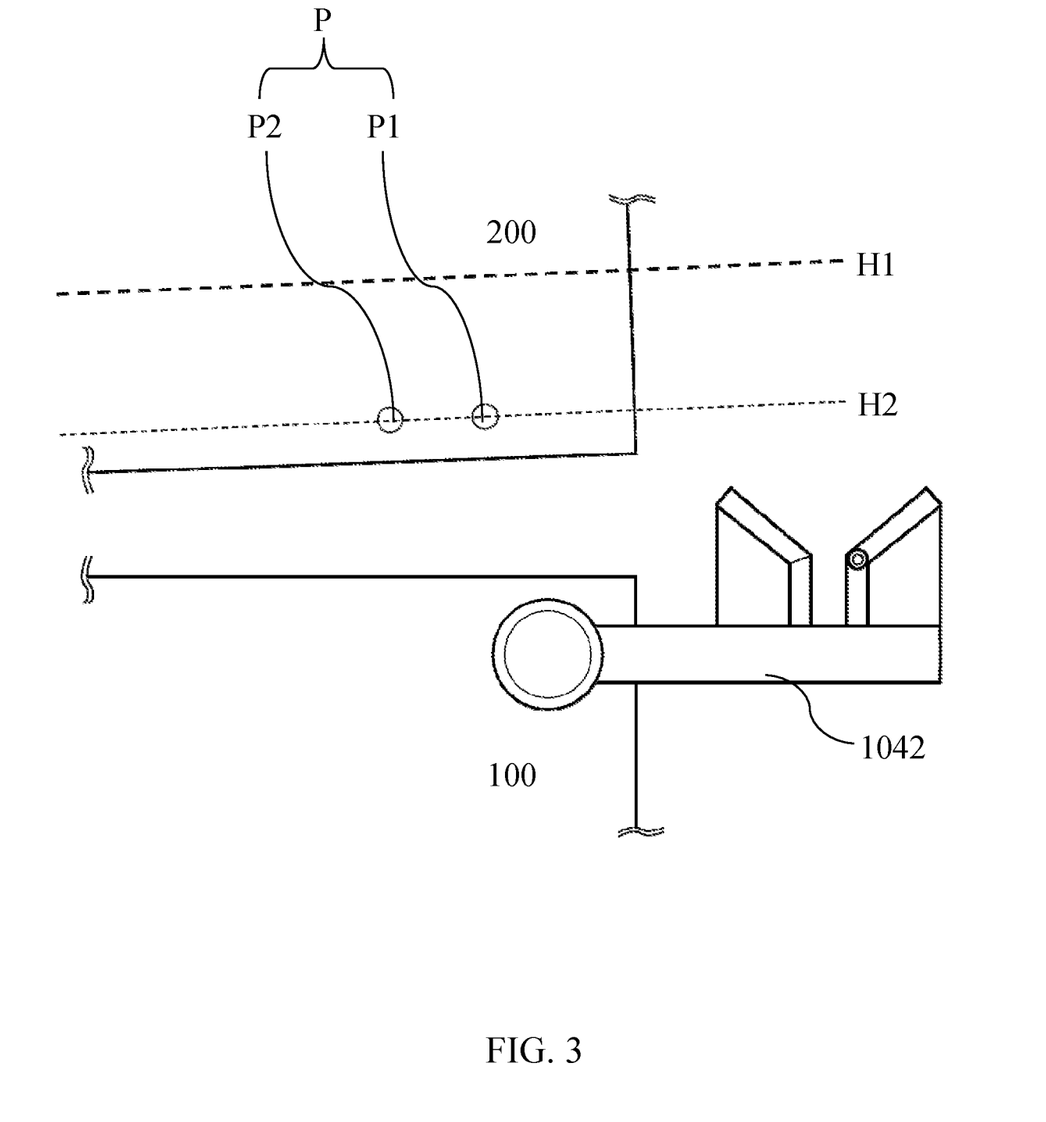
FIG. 3 is a working diagram of the bow berthing module of the embodiment of the present invention.
Figure 4:
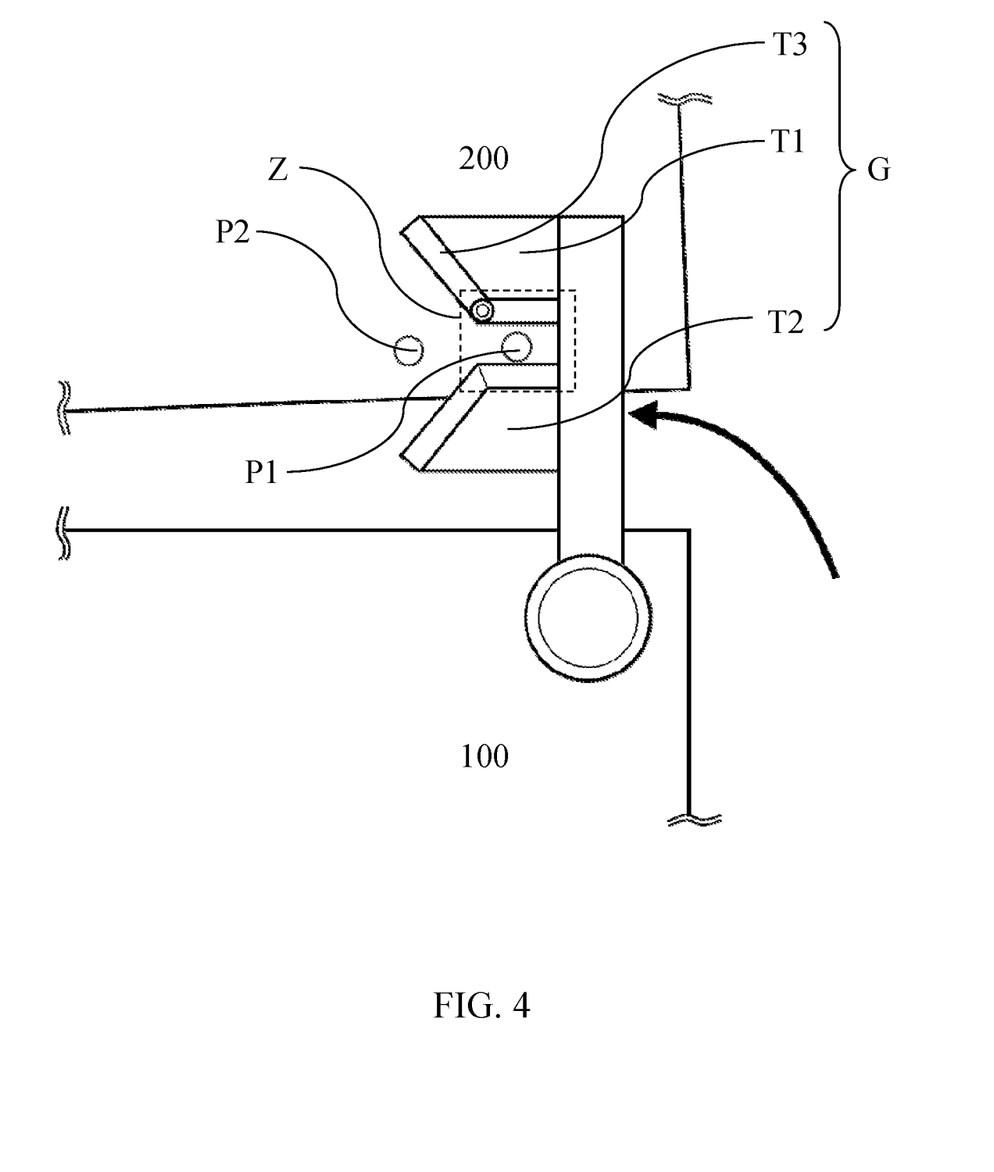
FIG. 4 is another working diagram of the bow berthing module of the embodiment of the present invention.
Figure 5:
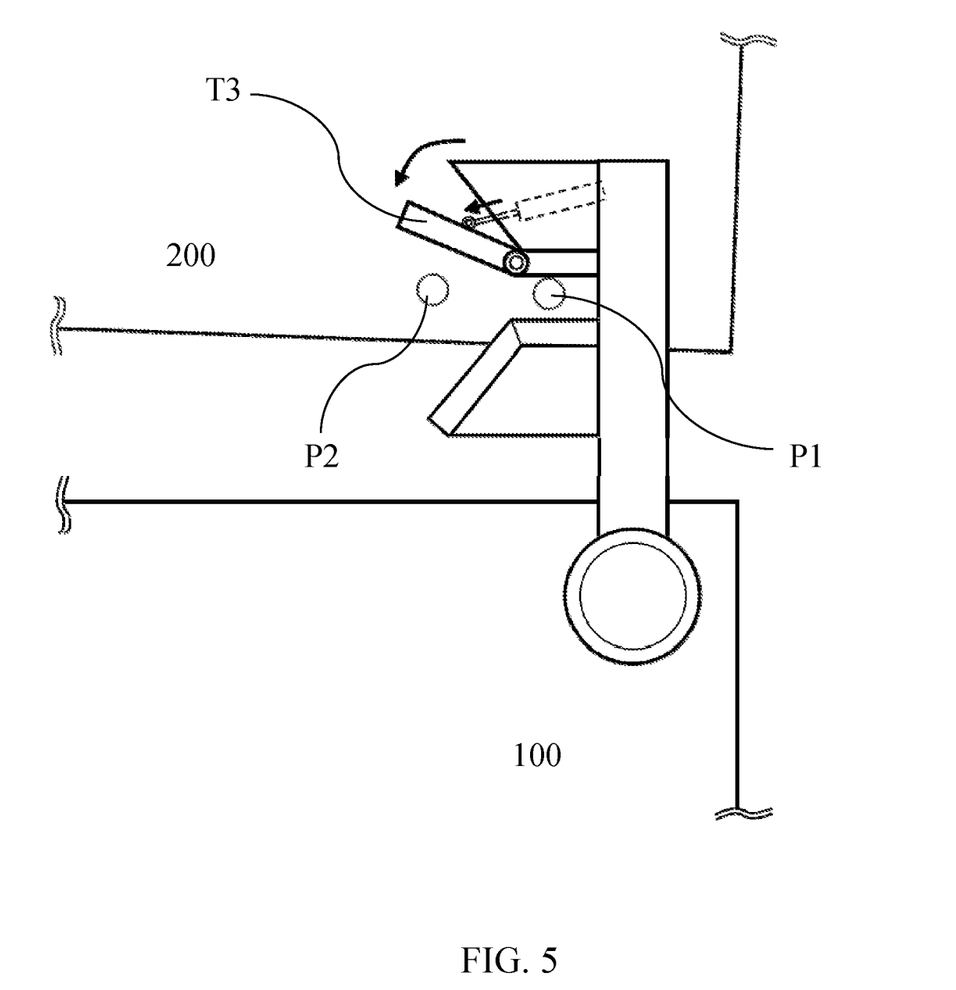
FIG. 5 is another working diagram of the bow berthing module of the embodiment of the present invention.
Figure 6:
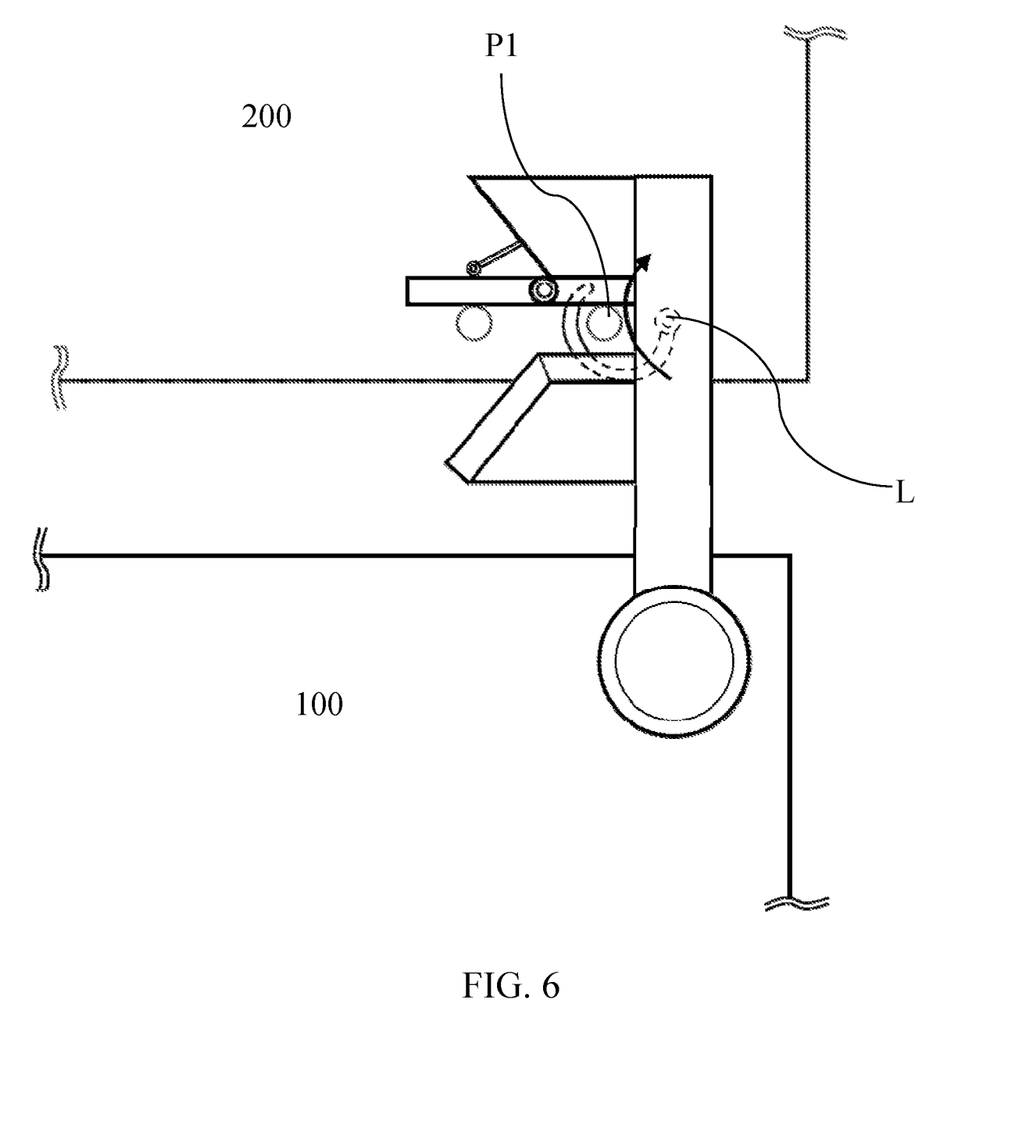
FIG. 6 is the other working diagram of the bow berthing module of the embodiment of the present invention.

Please refer to FIG. 1-FIG. 6. FIG. 2 is a schematic moving range diagram of the bow berthing module of the embodiment of the present invention. FIG. 3 is a working diagram of the bow berthing module of the embodiment of the present invention. FIG. 4 is another working diagram of the bow berthing module of the embodiment of the present invention. FIG. 5 is another working diagram of the bow berthing module of the embodiment of the present invention. FIG. 6 is the other working diagram of the bow berthing module of the embodiment of the present invention.

The bow berthing module 104 of this embodiment comprises a base 1041, a rotatable arm 1042, and a gripper 1043. The base 1041 is connected to controller 1031, and rotatable arm 1042 is connected to base 1041. The gripper 1043 is configured at the end of the rotatable arm 1042. In the present embodiment, as shown in FIG. 3-FIG. 6, the gripper 1043 includes guiding structure G and locking structure L.

Moreover, the side berthing module 105 comprises a wireless power supplying module 1051, which is connected to the busbar 1021 of the distribution board 102. According to the connection between the side berthing module 105 and the controller 1031, the side berthing module 105 of present embodiment is actually a movable wireless charging board supported by at least one mechanical arm. Thus the wireless power supplying module 1051 is configured inside the movable wireless charging board. The controller 1031 controls the aforementioned mechanical arm to determine the position of the movable wireless charging board, and decide that the wireless power supplying module 1051 starts or stops the power supply from the busbar 1021 of the distribution board 102, therefore to provide wireless power.

On the other hand, every vessel 200 in this embodiment comprises an automatic pilot system 201, a vessel controlling system 202, and a wireless power receiving unit 203. In order to consider the problem of power storage, the vessel 200 may be designed to have a power storage unit 204 to store excess/emergency power. The power storage unit 204 of the present embodiment may be lithium ion battery, lithium iron battery, lead-acid battery, aluminum battery or combinations thereof. The automatic pilot system 201 can be an industrial computer or any computer that can calculate the path or perform collision avoidance functions per se. The vessel controlling system 202 may comprise necessary communications, generators, batteries, electromechanical control equipment, engines, and other components related to vessel navigation communications. The present invention is not limited.

Therefore, the vessel controlling system 202 is connected to the automatic pilot system 201. The vessel controlling system 202 detects the power provided by generator or the state of charge (SOC) of battery in the vessel controlling system 202 via the automatic pilot system 201. When the state of charge (SOC) of the power storage unit 204 is insufficient, the automatic pilot system 201 send a (charging) requirement command to the wireless communication module 1032 via the wireless communicator in the vessel controlling system 202. After the wireless communication module 1032 receives the requirement command from the wireless communicator in the vessel controlling system 202, the wireless communication module 1032 transmits the aforementioned requirement command to controller 1031. Simultaneously, the controller 1031 controls the bow locking module 104 and the ship side locking module 105, thus the wireless power receiving unit 203 detachably but actively connects (touches or approaches) to the wireless power supplying module 1051. The wireless power supplying module 1051 can charge the battery in the vessel controlling system 202 or the power storage unit 204.

The complete charging steps of the present embodiment is started by the berthing of the vessel 200. Specifically, the berthing of the vessel 200 is operated via the mechanical movement of the bow berthing module 104 which is controlled by controller 1031. The guiding structure G corrects (straightly aligns) the bow direction of vessel 200, confirming that the position of vessel 200 is correct, then the berthing of vessel 200 is completed by locking structure L. After the aforementioned steps are completed, the controller 1031 commands the at least one mechanical arm of the side berthing module 105 to detachably connect the wireless power supplying module 1051 to the wireless power receiving unit 203, thus to charge the vessel 200. When the charging step has been started, the automatic pilot system 201 will continuously communicate with the wireless communication module 1032 via the wireless communicator in the vessel controlling system 202, and indirectly communicate with the controller 1031 that make the controller 1031 know how to control the movement of the bow berthing module 104 and the movement of the side berthing module 105, even the on/off of the wireless power supplying.

Please refer to FIG. 2. FIG. 2 illustrates that three operating positions of bow berthing module 104. The abovementioned operating positions are first operating position C, second operating position B and third operating position A. The operating positions of the present embodiment may bidirectionally and freely swing between thereof. Moreover, the rotatable arm 1042 angle between any operating positions ranges from 90° to 180°.

The first operating position C means the maintenance mode, the operating position C is ranged inside the charging barge 100. Therefore the maintenance staff may stand on the barge 100 and repair or check any damaged electromechanical structure of the rotatable base 1041, rotatable arm 1042 and gripper 1043 of the bow berthing module 104.

The third operating position A is the standby mode. When the bow berthing module 104 does not need to be repaired of checked, the base 1041 rotates the rotatable arm 1042 to the third operating position A. Therefore, the bow berthing module 104 may be on standby and execute any command which is sent from vessel 200.

The second operating position B is the berthing mode. In fact, when vessel 200 commands to berth or charge, the rotatable arm 1042 may rotates from third operating position A to second operating position B. Therefore, the operations of berthing or charging of the vessel(s) 200 may be completed.

Figure 7:
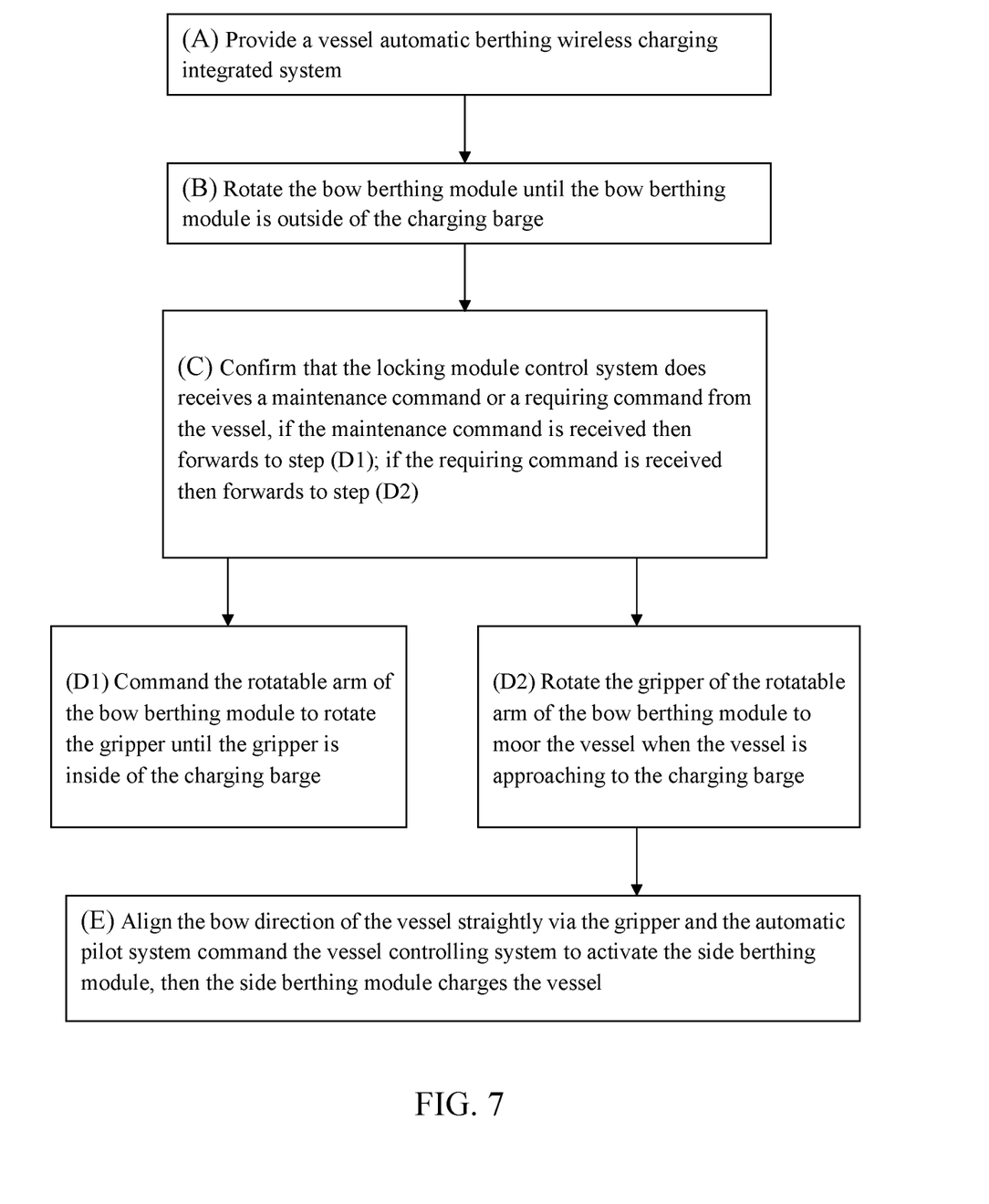
FIG. 7 is an operating method flow chart of the embodiment of the present invention.

Please refer to FIG. 7, FIG. 7 is an operating method flow chart of the embodiment of the present invention. The following description of FIG. 7 may be explained via FIG. 1 and FIG. 3 to FIG. 6.

As shown in FIG. 7, the operating method of the vessel automatic berthing wireless charging integrated system 10 of the present embodiment may firstly execute the step (A). The step (A) is to provide a vessel automatic berthing wireless charging integrated system 10 illustrated in FIG. 1-6.

The following step (B) is to rotate the bow berthing module until the bow berthing module is outside of the charging barge. In this embodiment, the bow berthing module 104 keeps on standby per se as the third operating position A shown in FIG. 3 while the wireless communication module 1032 of locking module control system 103 failing to receive any command from vessel 200.

Furthermore, the step (C) is to confirm that the locking module control system does receive a maintenance command or a requiring command from the vessel. If the maintenance command is received, then forwards to step (D1). Otherwise the requiring command is received, then forwards to step (D2).

In step (C), the locking module control system 103 is configured to decide the operating position (mode) via the wireless communication module 1032 receiving the requirement command from vessel 200 or the maintenance command from any third parties, such as the control center.

If the wireless communication module 1032 receives the maintenance command, then the step (D1) is to command the rotatable arm of the bow berthing module to rotate the gripper until the gripper is inside of the charging barge. In this step, the bow berthing module 104 which is rotated onto the charging barge 100 may be checked of repaired by the maintenance stuff on the charging barge 100.

If the wireless communication module 1032 receives the requirement command directly from vessel 200, or the vessel 200 uses other intermediate parties such as the shore control center to transmit the requirement command to the wireless communication module 1032; the step (D2) will be executed by the content of the requirement command. Specifically, the step (D2) is to rotate the gripper of the rotatable arm of the bow berthing module to moor the vessel when the vessel is approaching to the charging barge.

In other words, please see FIG. 1 and FIG. 3. When the vessel directly or indirectly sends the requirement command, the wireless communication module 1032 finally receives the requirements (contents) of the wireless communicator of the vessel controlling system 202. The requirement command may solely comprise the berthing requirement of vessel 200, or both of the berthing requirement and charging requirement of vessel 200.

In the present embodiment, the protocol and the exchange of charging needs between the wireless communication module 1032 and the wireless communicator of vessel controlling system 202 may be defined and set by skilled person or Bluetooth™. On the other hand, checking and communicating the position, movement, power distribution or the sailing status of vessel 200 may be accomplished by protocols such as MODBUS™ or Zigbee™. The present invention is not limited thereto.

In step (D2), when vessel 200 is approaching the charging barge 100, however the vessel 200 does not have tires or wheels such as the land transportation vehicle for adjusting the direction per se, the bow of the vessel 200 usually has a problem of the obliquity and fail to keep in parallel with the charging barge 100.

In this embodiment, the connection between the suitable vessel 200 and the bow berthing module requires the positioning structure P which is configured on vessel 200. As shown in FIG. 3, the positioning structure P of the vessel 200 of the present embodiment comprises a first positioning portion P1 and a second positioning portion P2, and the elongated direction of connecting line H2 between the first positioning portion P1 and the second positioning portion P2 are arranged in parallel with the elongated direction of bow and stern connecting line H1 of the vessel 200. Specifically, the first positioning portion P1 and the second positioning portion P2 of this embodiment may be two metal posts (piles). When the bow berthing module 104 engages the first positioning portion P1 and the second positioning portion P2, the first positioning portion P1 and the second positioning portion P2 will not be deformed.

Therefore, the vessel 200 of step (D2) may be illustrated as FIG. 3. The vessel 200 approaches to the charging barge 100 and the positioning structure P on the stern per se is almost in parallel with the side edge of the charging barge 100. Moreover, the positioning structure P shall move within the radius of gyration of rotatable arm 1042 of the bow berthing module 104. Otherwise, the rotatable arm 1042 may be designed to have telescopic actuation function and thus to adjust the radius of gyration per se via the location of vessel 200. The present invention is not limited thereto.

As shown in FIG. 4, when the vessel 200 sail to the location illustrated in FIG. 3, the bow berthing module 104 will be rotated form the third operating position A to second operating position B. In present embodiment, the guiding structure G of gripper 1043 may determine whether the radius of gyration of rotatable arm 1042 is capable or not.

The guiding structure G of the present invention comprises a first guiding tooth T1, a second guiding tooth T2, and a guiding board T3 which is rotatably configured at the end of first guiding tooth T1. The first guiding tooth T1 is configured on the rotatable arm 1042 and the second guiding tooth T2 is, too. The gripping zone Z is formed between the first guiding tooth T1 and the second guiding tooth T2. According to the V shape guiding structure formed by the first guiding tooth T1 and the second guiding tooth T2 and the inward gripping zone Z. The aforementioned capable radius of gyration of rotatable arm 1042 means that the positioning structure P can be engage with the first guiding tooth T1 and the second guiding tooth T2 when the first guiding tooth T1 and the second guiding tooth T2 are rotated.

In other words, the position and location of positioning structure P is capable may be checked by the camera (optical sensors) which is configured in vessel controlling system 202 of vessel 200. Furthermore, the checking method may be operated by other optical recognition systems which perform artificial intelligence image recognition or ranging to confirm the capabilities. Of course, the optical recognition system or camera may also be configured on other places such as the charging barge 100 or the shore control center. The present invention is not limited thereto.

When the position and location of positioning structure P has been checked, the rotatable arm 1042 may rotate and engage the first positioning portion P1. The first positioning portion P1 is in the gripping zone Z. At the same time the bow direction of vessel 200 is probability not in parallel with the charging barge 100 due to the water vehicle characteristic. Please see FIG. 5. As shown in FIG. 5, the guiding board T3 may be rotated by an (liquid) actuator which is configured in the first guiding tooth T1 until the guiding board T3 is in parallel with the charging barge 100. Simultaneously, the guiding board T3 presses the second positioning portion P2.

Therefore, the direction between first positioning portion P1 and second positioning portion P2 is adjusted via the gripping zone Z and guiding board T3, and the connecting line H1 between the bow and stern of the vessel 200 is also adjusted to be in parallel with the side edge of charging barge 100. Please refer to FIG. 6. When the vessel 200 has been adjusted, the locking structure L launches from the rotatable arm 1042 and penetrates the second guiding tooth T2, locking the first positioning portion P1.

In the present embodiment, the locking structure L is designed as a hook and only locks the first positioning portion P1, however, the structure which can be locked by the locking structure L is not limited to the first positioning portion P1, the first positioning portion P2, or the combination thereof. The present invention is not limited thereto.

In step (E), step (E) is to align the bow direction of the vessel straightly via the gripper and the automatic pilot system command the vessel controlling system to activate the side berthing module, then the side berthing module charges the vessel. As illustrated in the abovementioned steps and FIG. 3-FIG. 6, the gripper 1043 aligns the bow direction of the vessel 200 and accomplishes the mooring work.

In addition, if the requirement command sent by vessel 200 further comprises the charging requirement and the operations of FIG. 3 to FIG. 6 are accomplished; the controller 1031 further commands the side berthing module 105 to match the wireless power receiving unit 203 of vessel 203. In order to satisfy the wireless power receiving unit 203, the vessel controlling system 202 comprises necessary circuits such as power management system or battery protection/management circuit. The present invention is not limited thereto.

In this embodiment, the wireless power supplying module 1051 and the wireless power receiving unit 203 can be constructed by a transmitting circuit, a transmission circuit, a power correction circuit, a power transmission circuit, a DC step-down module, or the combination thereof. The input voltage is 220V single-phase AC power converted to 330-350V DC power for output. The output power is 7 kilowatts, the acceptable charging distance is between 15-20 cm, and the charging efficiency is more than 95%.

No matter the types of requirement command, when the bow berthing module 104 is crashed by a force which is over a first threshold, or the rotational degree of the rotatable arm 1042 caused by the force is over a second threshold, a step (F) will be instantly executed. The step (F) is that the gripper 1043 releases the vessel 200, and the rotatable arm 1042 rotates the gripper 1043 to outside of the charging barge 100 (the third operating position A). In the present embodiment, the first threshold is 500 kg and the second threshold is 120°. As a result, when the vessel 200 is in emergency or crushed, this mechanism may make sure that the vessel 200 is safe and safely escape from the charging barge 100.

As understood by a person skilled in the art, the foregoing preferred embodiments of the present invention are illustrated of the present invention rather than limiting of the present invention. It is intended to cover various modifications and similar arrangements comprised within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A vessel automatic berthing wireless charging integrated system, comprising:
   a charging barge, comprising:
     a power;
     a distribution board, connected with the power;
     a locking module control system, connected with the distribution board;
     wherein the locking module control system comprises:
       a controller;
       a wireless communication module, connected with the controller;
       a bow berthing module, connected with the controller;
       wherein the bow berthing module comprises:
         a base, connected with the controller;
         a rotatable arm, connected with the base;
         a gripper, configured at end of the rotatable arm;
         wherein the gripper further comprises a guiding structure and a locking structure;
       a side berthing module, connected with the controller;
       wherein the side berthing module comprises:
         a wireless power supplying module, connected with the distribution board; and
     at least one vessel, comprising:
       an automatic pilot system;
       a vessel controlling system, connected with the automatic pilot system and communicated with the wireless communication module;
       a wireless power receiving unit, connected with the vessel controlling system and detachably matched with the wireless power supplying module;
   wherein the bow berthing module moors the vessel and the guiding structure of the bow berthing module straightly aligns bow direction of the vessel and then the wireless power supplying module of the side berthing module matches with the wireless power receiving module, charging the vessel.

2. The vessel automatic berthing wireless charging integrated system as claimed in claim 1, wherein the vessel further comprises a positioning structure;

wherein the positioning structure comprises a first positioning portion and a second positioning portion, and connecting line direction between the first positioning portion and the second positioning portion is configured to be parallel with connecting line direction between bow and stern of the vessel.

3. The vessel automatic berthing wireless charging integrated system as claimed in claim 2, wherein the guiding structure further comprises:

a first guiding tooth, configured on the rotatable arm, and a guiding board is rotatably configured on end of the first guiding tooth; and a second guiding tooth, configured on the rotatable arm;

wherein the second guiding tooth forms a gripping zone which is between the second guiding tooth and the first guiding tooth;

wherein the locking structure is configured in the gripping zone;

wherein if the first positioning portion and the second positioning portion enter the gripping zone, the locking structure locks the first positioning portion, the second positioning portion or combinations thereof.

4. The vessel automatic berthing wireless charging integrated system as claimed in claim 3, wherein the locking structure is a hook.

5. An operating method of a vessel automatic berthing wireless charging integrated system, comprising:

(A) providing the vessel automatic berthing wireless charging integrated system as claimed in claim 1;

(B) rotating the bow berthing module until the bow berthing module is outside of the charging barge;

(C) confirming that the locking module control system does receives a maintenance command or a requirement command from the vessel;

wherein if the maintenance command is received then forwards to step (D1);

wherein if the requirement command is received then forwards to step (D2);

(D1) commanding the rotatable arm of the bow berthing module to rotate the gripper until the gripper is inside of the charging barge;

(D2) rotating the gripper of the rotatable arm of the bow berthing module to moor the vessel when the vessel is approaching to the charging barge, then forwards to step (E);

(E) aligning bow direction of the vessel straightly via the gripper and the automatic pilot system commanding the vessel controlling system to activate the side berthing module, then the side berthing module charges the vessel.

6. The operating method of a vessel automatic berthing wireless charging integrated system as claimed in claim 5, in the steps (D2) or (E), if the bow berthing module is crashed by a force which is over a first threshold or rotational degree of the rotatable arm caused by the force is over a second threshold, a step (F) will be instantly executed;

wherein the step (F) is that the gripper releases the vessel, and the rotatable arm rotates the gripper to outside of the charging barge.

7. The operating method of a vessel automatic berthing wireless charging integrated system as claimed in claim 6, wherein the first threshold is 500 kg.

8. The operating method of a vessel automatic berthing wireless charging integrated system as claimed in claim 6, wherein the second threshold is 120°.

\* \* \* \* \*